United States Patent Office 3,410,898
Patented Nov. 12, 1968

3,410,898
2-ARYL-2-(CHLOROACETO) ACETAMIDES
Angelo John Speziale, Creve Coeur, and Lowell R. Smith, Chesterfield, Mo., assignors to Monsanto Company, St. Louis, Mo., a corporation of Delaware
No Drawing. Filed May 14, 1965, Ser. No. 455,996
10 Claims. (Cl. 260—558)

ABSTRACT OF THE DISCLOSURE

A class of 2-(chloro substituted aceto) acetamides further substituted in the 2-position thereof with phenyl or chloro substituted phenyl and wherein the amido nitrogen of which is tertiary nitrogen by virtue of having two additional substituents both of an aliphatic nature and each having from 1 to 3 carbon atoms, inclusive. These compounds are herbicidally and insecticidally active.

---

This invention relates to new and useful 2-aryl-2-(chloroaceto)acetamides of the formula

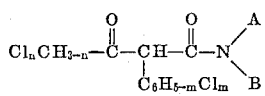

wherein $n$ is a whole number from 1 to 3, wherein $m$ is a number from 0 to 3, and wherein A and B are like or unlike aliphatic radicals having from 1 to 3 carbon atoms such as methyl, ethyl, propyl, allyl, chloroethyl, dichloroethyl, chloropropyl, dichloropropyl, 2-chloroallyl, 3-chloroallyl, 2,3-dichloroallyl, 3,3-dichloroallyl, and the various alkyl, alkenyl, chloroalkyl and chloroalkenyl position isomers thereof.

The compounds of this invention are prepared by refluxing a mixture of a chloroacetyl chloride of the formula

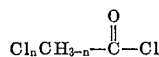

wherein $n$ has the aforedescribed significance (e.g. α-chloroacetyl chloride, α,α-dichloroacetyl chloride and α,α,α-trichloroacetyl chloride) with a 2-aryl acetamide of the formula

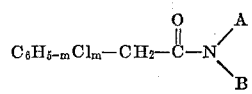

wherein $m$, A and B have the aforedescribed significance [e.g. N,N-dimethyl 2-phenylacetamide, N,N-diethyl 2-phenylacetamide, N,N-diallyl 2-phenylacetamide, N,N-di(2-chloroallyl)2 - phenylacetamide, N,N-di(2,3-dichloroallyl) 2-phenylacetamide, N-methyl-N-isopropyl 2-phenylacetamide, N,N-dimethyl 2 - (2-chlorophenyl)acetamide, N,N - diethyl 2-(2,4-dichlorophenyl)acetamide, N,N-diallyl 2-(2,4,5-trichlorophenyl)acetamide, N-methyl-N-isopropyl 2-(2,4,6-trichlorophenyl)acetamide, and the various position isomers thereof]. While theoretically the acid chloride reactant and the acetamide reactant combine in equimolecular proportions to provide the 2-aryl-2-(chloroaceto)acetamide it is necessary to employ from 2 to 2.5 moles of the former to one mole of the latter. The reaction is ordinarily carried out in the presence of an inert organic liquid, e.g. benzene, toluene, xylene and the like. Upon completion of the refluxing operation, in which operation the hydrogen chloride by-product is preferably completely withdrawn as it forms, the reaction mass is quenched with from 1 to 5 moles of water per mole of the acetamide reactant charged. The organic layer is separated and neutralized by washing with aqueous alkali, e.g. NaHCO₃, to rid the mass of any free acids and the 2-aryl-2-(chloroaceto)acetamide recovered.

As illustrative of this invention but not imitative thereof is the following:

EXAMPLE I

To a suitable reaction vessel equipped with a thermometer, agitator and reflux condenser, is charged 17.7 parts by weight of N,N-diethyl 2-phenylacetamide, 36.4 parts by weight of α,α,α-trichloroacetyl chloride and 88 parts by weight of benzene. The so charged mass is heated while agitating to the reflux temperature and then refluxed for seventy-two hours. Thereupon 3.6 parts by weight of cold water is added and the mass agitated for about one hour. The organic layer is withdrawn and washed with approximately 120 parts by weight of a saturated aqueous sodium bicarbonate solution and thereafter the so washed organic fluid is dried over anhydrous sodium sulfate. The benzene is then evaporated and the solid residue recrystallized from a charcoal-methylene chloride-hexane mixture. The recrystallized product is N,N-diethyl 2-phenyl-2-(α,α,α-trichloroaceto)acetamide, (M.P. 114–116° C.).

EXAMPLE II

Employing the procedure of Example I but replacing N,N-diethyl 2-phenylacetamide with an equimolecular proportion of N,N-diallyl 2-phenylacetamide, there is obtained N,N-diallyl 2-phenyl-2-(α,α,α-trichloroaceto)acetamide.

EXAMPLE III

Employing the procedure of Example I but replacing N,N-diethyl 2-phenylacetamide with an equimolecular proportion of N,N-di(2-chloroallyl) 2-phenylacetamide, there is obtained N,N-di(2-chloroallyl) 2-phenyl-2-(α,α,α-trichloroaceto)acetamide.

EXAMPLE IV

Employing the procedure of Example I but replacing α,α,α-trichloroacetyl chloride with an equimolecular proportion of α,α-dichloroacetyl chloride, there is obtained N,N-diethyl 2-phenyl-2-(α,α-dichloroaceto)acetamide.

EXAMPLE V

Employing the procedure of Example I but replacing α,α,α-trichloroacetyl chloride with an equimolecular proportion of α-chloroacetyl chloride, there is obtained N,N-diethyl 2-phenyl-2-(α-chloroaceto)acetamide.

EXAMPLE VI

Employing the procedure of Example I but replacing N,N-diethyl 2-phenylacetamide with an equimolecular proportion of N,N-dimethyl 2-(2-chlorophenyl)acetamide, there is obtained N,N-dimethyl 2-(2-chlorophenyl)-2-(α,α,α-trichloroaceto)acetamide.

EXAMPLE VII

Employing the procedure of Example I but replacing N,N-diethyl 2-phenylacetamide with an equimolecular proportion of N,N-diethyl 2-(2,4-dichlorophenyl)acetamide, there is obtained N,N-diethyl 2 - (2,4 - dichlorophenyl)-2-α,α,α-trichloroaceto)acetamide.

EXAMPLE VIII

Employing the procedure of Example I but replacing N,N-diethyl 2-phenylacetamide, and α,α,α-trichloroacetyl chloride, respectively, with equimolecular proportions of N,N-diallyl 2-(2-chlorophenyl)acetamide and α,α-dichloroacetyl chloride, there is obtained N,N-diallyl-1,2-(2-chlorophenyl)-2-(α,α-dichloroaceto)acetamide.

EXAMPLE IX

Employing the procedure of Example I but replacing N,N-diethyl 2-phenylacetamide and α,α,α-trichloroacetyl chloride, respectively, with equimolecular proportions of N,N-di(2-chloroethyl) - 2 - (4-chlorophenyl)acetamide and α-chloroacetyl chloride, there is obtained N,N-di(2-chloroethyl)-2-(4-chlorophenyl) - 2 - (α-chloroaceto)acetamide.

EXAMPLE X

Employing the procedure of Example I but replacing N,N-diethyl 2-phenylacetamide with an equimolecular proportion of N-methyl-N-isopropyl 2-(2,4,5-trichlorophenyl)acetamide, there is obtained N-methyl-N-isopropyl 2-(2,4,5-trichlorophenyl)-2-(α,α,α-trichloroaceto)-acetamide.

EXAMPLE XI

Employing the procedure of Example I but replacing N,N-diethyl 2-phenylacetamide with an equimolecular proportion of N-methyl-N-(2-chloroallyl) 2-phenylacetamide, there is obtained N-methyl-N-(2-chloroallyl) 2-phenyl-2-(α,α,α-trichloroaceto)acetamide.

EXAMPLE XII

Employing the procedure of Example I but replacing N,N-diethyl 2-phenylacetamide with an equimolecular proportion of N,N-dimethyl 2-2,4,6-trichlorophenyl) acetamide, there is obtained N,N-dimethyl 2-(2,4,6-trichlorophenyl)-2-(α,α,α-trichloroaceto)acetamide.

EXAMPLE XIII

Employing the procedure of example I but replacing N,N-diethyl 2-phenylacetamide and α,α,α-trichloroacetyl chloride, respectively, with equimolecular proportions of N-ethyl-N-allyl 2-(2,4-dichlorophenyl)acetamide and α,α-dichloroacetyl chloride, there is obtained N-ethyl-N-allyl 2-(2,4-dichlorophenyl)-2-(α,α-dichloroaceto)acetamide.

EXAMPLE XIV

Employing the procedure of Example I but replacing N,N-diethyl 2-phenylacetamide and α,α,α-trichloroacetyl chloride, respectively, with equimolecular proportions of N-isopropyl-N-(2,3-dichloroallyl) 2-phenylacetamide and α,α-dichloroacetyl chloride, there is obtained N-isopropyl-N-(2,3-dichloroallyl) 2-phenyl-2-(α,α-dichloroaceto)acetamide.

EXAMPLE XV

Employing the procedure of Example I but replacing N,N-diethyl 2-phenylacetamide and α,α,α-trichloroacetyl chloride, respectively, with equimolecular proportions of N-n-propyl-N-allyl 2-(3,4-dichlorophenyl)acetamide and α-chloroacetyl chloride, there is obtained N-n-propyl-N-allyl 2 - (3,4 - dichlorophenyl)-2,2-(α-chloroaceto)acetamide.

EXAMPLE XVI

Employing the procedure of Example I but replacing N,N-diethyl 2-phenylacetamide with an equimolecular proportion of N,N-diethyl 2-(2,4,5-trichlorophenyl)acetamide, there is obtained N,N-diethyl 2-(2,4,5-trichlorophenyl)-2-(α,α,α-trichloroaceto)acetamide.

EXAMPLE XVII

Employing the procedure of Example I but replacing N,N-diethyl 2-phenylacetamide with an equimolecular proportion of N,N-disopropyl 2-phenylacetamide, there is obtained N,N-diisopropyl 2-phenyl - 2 - (α,α,α-trichloroaceto)acetamide.

EXAMPLE XVIII

Employing the procedure of Example I but replacing N,N-diethyl 2-phenylacetamide with an equimolecular proportion of N,N-dimethyl 2-phenylacetamide, there is obtained N,N-dimethyl 2-phenyl-2-(α,α,α-trichloroaceto) acetamide.

EXAMPLE XIX

Employing the procedure of Example I but replacing N,N-diethyl 2-phenylacetamide with an equimolecular proportion of N,N-di(2,2-dichloroethyl) 2-phenylacetamide, there is obtained N,N-di(2,2-dichloroethyl) 2-phenyl-2-(α,α,α-trichloroaceto)acetamide.

The 2-aryl-(chloroaceto)acetamides of this invention are useful as contact herbicides against broad leaf and narrow leaf plants, for example applying to growing plants N,N-diethyl 2-phenyl - 2,2 - (α,α,α-trichloroaceto) acetamide in an aqueous spray at a concentration of one percent by weight exhibited effective control of morning glory, radish, pigweed, brome grass and wild oat. These 2-aryl-2-(2-chloroaceto)acetamides were also effective in the control of southern armyworm larvae *Prodenia eridania,* for example N,N-diethyl 2-phenyl-2-(α,α,α-trichloroaceto)acetamide at a concentration of one percent by weight in water exhibited effective control thereof on contacting same.

While this invention has been described with respect to certain embodiments it is to be understood that it is not so limited and that variations and modifications thereof obvious to those skilled in the art can be made without departing from the spirit or scope of this invention.

What is claimed is:

1. A 2-aryl-2-(chloroaceto)acetamide of the formula

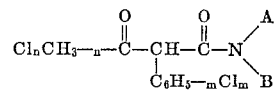

wherein $n$ is a whole number from 1 to 3, inclusive, wherein $m$ is a number from 0 to 3, inclusive, and wherein A and B, respectively, are selected from the group consisting of (a) alkenyl having but 3 carbon atoms, (b) chloroalkenyl having but 3 carbon atoms, (c) alkyl having from 1 to 3 carbon atoms, inclusive, and (d) chloroalkyl having from 1 to 3 carbon atoms, inclusive.

2. A 2-phenyl-2-(α,α,α-trichloroaceto)acetamide of the formula

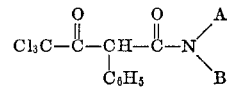

wherein A and B, respectively, are alkyl having from 1 to 3 carbon atoms.

3. A 2-aryl-2-(α,α,α-trichloroaceto)acetamide of the formula

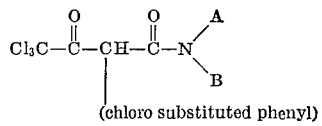

wherein A and B, respectively, are alkyl having from 1 to 3 carbon atoms, and wherein chloro substituted phenyl has from 1 to 3 chlorine substituents.

4. N,N-diethyl 2 - phenyl - 2 - (α,α,α - trichloroaceto) acetamide.

5. [N,N-dimethyl] N,N-dimethyl 2-(2-chlorophenyl)-2-(α,α,α-trichloroaceto)acetamide.

6. N,N - diethyl 2 - (2,4 - dichlorophenyl) - 2 - (α,α,α-trichloroaceto)acetamide.

7. N-methyl-N-isopropyl 2-(2,4,5-trichlorophenyl)-2-(α,α,α-trichloroaceto)acetamide.

8. N,N - diallyl 2 - phenyl - 2 - (α,α,α - trichloroaceto) acetamide.

9. A method making a 2-aryl-2-(chloroaceto)acetamide of the formula

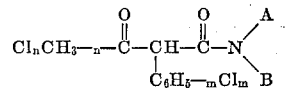

wherein $n$ is a whole number from 1 to 3, inclusive, wherein $m$ is a number from 0 to 3, inclusive and wherein A and B, respectively, are selected from the group consisting of (a) alkenyl having but 3 carbon atoms, (b) chloroalkenyl having but 3 carbon atoms, (c) alkyl having from 1 to 3 carbon atoms, inclusive, and (d) chloroalkyl having from 1 to 3 carbon atoms, inclusive, which comprises refluxing a mixture of one mole of a 2-aryl acetamide of the formula

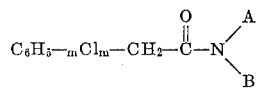

wherein $m$, A and B have the aforedescribed significance and from 2 to 2.5 moles of a chloroacetyl chloride of the formula

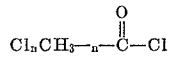

wherein $n$ has the aforedescribed significance, in the presence of an inert organic liquid and thereafter quenching the resulting mass with from 1 to 5 moles of water.

10. A method in accordance with claim 9 of making a 2-aryl-2-(chloroaceto) acetamide of the formula therein wherein $n$ is 3, wherein $m$ is zero, and wherein A and B, respectively, are ethyl, which comprises refluxing a mixture of one mole of a 2-aryl acetamide of the formula therein wherein $m$, A and B have the foregoing respective significances and from 2 to 2.5 moles of a chloroacetyl chloride of the formula therein wherein $n$ has the foregoing significance, in the presence of an inert organic liquid and thereafter quenching the resulting mass with from 1 to 5 moles of water, which method provides for N,N-diethyl 2-phenyl-2-($\alpha,\alpha,\alpha$-trichloroaceto)acetamide.

References Cited

UNITED STATES PATENTS 3,284,500   11/1966   Tieman _____ 260—561

HENRY R. JILES, *Primary Examiner.*

H. I. MOATZ, *Assistant Examiner.*